March 3, 1931.　　　C. ZITKO　　　1,794,817
CONDUCTOR HOOK
Filed Feb. 29, 1928
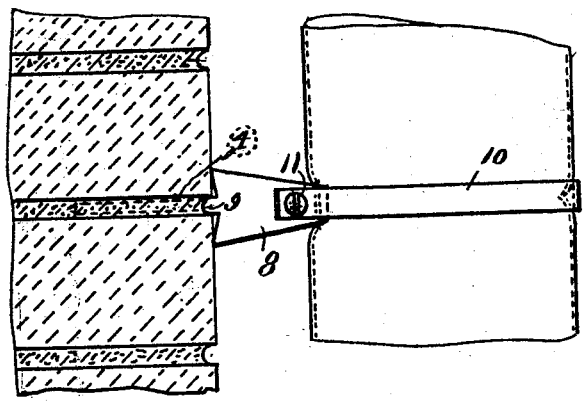
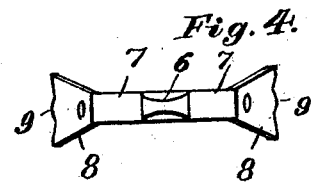
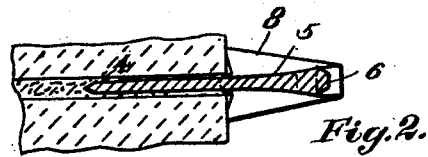
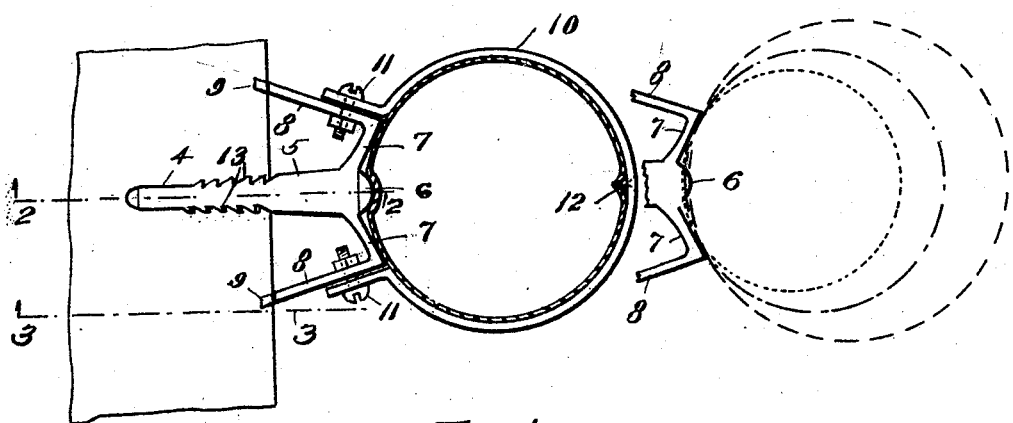
INVENTOR
Charles Zitko,
BY
H. M. Plaisted,
ATTORNEY.

Patented Mar. 3, 1931

1,794,817

UNITED STATES PATENT OFFICE

CHARLES ZITKO, OF ST. LOUIS, MISSOURI

CONDUCTOR HOOK

Application filed February 29, 1928. Serial No. 258,021.

This invention relates to certain new and useful improvements in conductor hooks, the peculiarities of which will be hereinafter described and claimed.

The main object of my invention is to provide a braced support or hook for a downspout conductor pipe that can be used for several sizes of pipe, will support the pipe away from the wall of a building, and hold it firmly braced against lateral displacement. Other objects will be hereinafter described and claimed.

In the accompanying drawing in which like reference numerals indicate corresponding parts, Fig. 1 represents a plan view of a hook exemplifying my invention, showing its relation to a brick wall and a conductor pipe in section;

Fig. 2, a vertical section on the line 2—2 of Fig. 1 without the pipe;

Fig. 3, a similar section on the line 3—3 of Fig. 1;

Fig. 4, a front view of my hook alone; and

Fig. 5, a plan view of the outer portion of my hook with circles indicating various diameters of pipe, showing diagrammatically their relation to my hook.

A common form of conductor hook holds the pipe close to the wall of a building thereby obstructing painting, and requiring to be made in various sizes for corresponding sizes of pipes. A contractor is obliged therefore to lay in a supply of various sizes of such form of hook to fit the different pipes he may have to put up. Such hooks often allow displacement of the pipes on which they are used, when subjected to heavy storms and long-continued use.

My device holds the pipe away from the wall making it accessible for painting and replacement, and bracing the pipe strongly against lateral and vertical strains. Also it is adapted to hold any size and shape of pipe commonly used for downspouts, and a worn-out pipe can be readily replaced without removing my hooks from the wall.

Referring to the drawing, the numeral 4 designates a pointed, horizontally-flattened shank adapted to be driven into the mortar joints of a brick wall or elsewhere, having an outside body portion 5 provided with a terminal round-pointed head 6 for hammer contact and pipe engagement. Arms 7 branch laterally from the sides of the body and preferably flaring outward at a wide angle to each other, to engage the surface of a circular (or other) pipe constituting a downspout. The said head is sessile between said arms.

From the ends of these arms preferably, wings 8 extend flaringly backward towards the wall and are widened vertically (as illustrated in Figs. 2, 3 and 4) to their tail-like bearing ends which engage the wall in position. A central spur 9 extends slightly beyond the tail ends and is adapted to fit into the coved mortar joint as made by a round jointer; or it may be driven into the flush surface of a trowel joint. In either case the tail ends of said wings engage the face of the bricks above and below the mortar joint, and brace the flaring arms vertically and laterally against movement.

Pipe-encircling means such as a flat band 10 with perforated end lugs, is fastened by the usual bolts 11 through holes in said bracing wings or otherwise, and preferably has an inward projection 12 adapted to engage the pipe opposite the head 6. The pipe is indented at these points as indicated in Figs. 1 and 3, and is held from vertical slipping by this head and band projection.

Fig. 5 illustrates the engagement made by several sizes of pipe in diagram, with the head and arms of my device. All the sizes engage the arms 7 and head 6,— the smaller (dotted) pipe being indented by the head more than the larger (dashed) pipe, but all being held, and firmly braced by the wings 8. This makes a three-point contact of the head and arms with the pipe and the middle point preferably enters an indentation of the pipe as shown in Fig. 1. The other contact points of the arms 7 assist the middle point in holding the pipe from vertical and turning movement.

When my hook is used on a wooden wall, screw-threads or alternating serrations 13 on the side edges of my flattened shank engage the wood like a lag screw, and assist in holding the tail ends of the wings against the face of the wall.

If desired, the sessile head 6 may be omitted and the engagement of the outwardly flaring arms be relied on, as maintained by the band or other pipe-encircling means.

The set-off position of the pipe and wings facilitates insertion of the fastening bolts.

I claim:

1. The combination with a conductor pipe having indentations at opposite sides of its circumference, of a conductor hook comprising a shank and body with a terminal head adapted to enter one of said indentations, said body having laterally branching arms and backwardly extending wings, and an encircling band connected to the wings and having an inward projection adapted to engage the indented pipe opposite said head, substantially as described.

2. A conductor hook consisting of a central shank and body adapted to be driven into a horizontal mortar joint in a brick wall, lateral arms branching outward from said body, and wings extending backward and ending in taillike bearing ends each having a single central spur extending beyond the said ends in the same horizontal plane of the body and adapted to fit into the same mortar joint as the shank while the shorter portions of said ends bear on the brick wall above and below said joint, and pipe encircling means connected to said wings beyond said arms, substantially as described.

In testimony whereof I have affixed my signature.

CHARLES ZITKO.